United States Patent [19]

Scarpiello et al.

[11] 4,209,547

[45] Jun. 24, 1980

[54] HIGH MELTING FAT COMPOSITION AND PROCESS OF MAKING

[75] Inventors: Daniel A. Scarpiello, Parma Heights; Anthony G. Herzing, Middleburg Heights, both of Ohio

[73] Assignee: SCM Corporation, New York, N.Y.

[21] Appl. No.: 967,241

[22] Filed: Dec. 7, 1978

[51] Int. Cl.² ............................................. A23D 5/00
[52] U.S. Cl. .................................... 426/607; 426/610
[58] Field of Search ................................ 426/607, 610

[56] References Cited

U.S. PATENT DOCUMENTS

| | | | |
|---|---|---|---|
| 3,132,951 | 5/1964 | Thompson | 426/607 |
| 3,796,816 | 3/1974 | Hasman et al. | 426/607 |
| 4,134,905 | 1/1979 | Hasman | 426/607 X |

Primary Examiner—Robert A. Yoncoskie
Attorney, Agent, or Firm—Richard H. Thomas

[57] ABSTRACT

A composition comprises about 95-99% selectivey hydrogenated fat containing at least about 98% $C_{16}$-$C_{18}$ triglycerides and between about 8% and 30% $C_{16}$ fat-forming acid content, a Mettler Dropping Point of between about 104° and 109° F., and a Solids Fat Index profile of 62-68 at 50° F., 49-60 at 70° F., 42-56 at 80° F., 22-34 at 92° F., and 7-18 at 100° F.; and about 1-5% of at least two lipoidal emulsifiers therefor. Such composition preferaby is edible and is more organoleptically acceptable than its conventional counterpart having a lower Mettler Dropping Point.

13 Claims, 5 Drawing Figures

HIGH MELTING FAT COMPOSITION AND PROCESS OF MAKING

BACKGROUND OF THE INVENTION

The present invention relates to a lipoidal hard butter composition, and more particularly to one comprising a relatively high melting, selectively hydrogenated fat and lipoidal emulsifiers therefor, and to an improved process for making same.

As most hard butters essentially serve as blendable replacements for cocoa butter in the dairy and confectionary industries, for example, it has been accepted generally that such blendable replacements should have a melting point (Wiley Melting Point or Mettler Dropping Point) or around or below body temperature (say, about 88°-98° F.) for providing good mouth feel, a cooling-like sensation upon rapid melting (meltability), and for not being waxy. (Collectively, these terms in part are defined as "organoleptic properties" or simply "organoleptics" of the composition for purposes of this patent application.) Hard butters having a higher melting point, say about 98°-110° F. and higher, are known, but generally are considered to be cheap substitutes or replacements for cocoa butter because of their tendency to be rather waxy in mouth feel.

The present invention contrary to the art discloses an edible composition suitable as a hard butter which displays better organoleptics at higher Mettler Dropping Point (hereinafter MDP), than its conventional counterpart having a lower MDP which more approximates body temperature. The instant composition especially excels in meltability, lack of waxiness, and overall organoleptic acceptability compared to its conventional counterpart, while maintaining acceptable physical properties such as viscosity, set time, penetration, gloss, hardness, and like properties.

BROAD STATEMENT OF THE INVENTION

The novel composition of the present invention preferably is edible and comprises about 95 to 99% by weight of selectively hydrogenated glyceride oil and about 1 to 5% by weight of at least two lipoidal emulsifiers. The selectively hydrogenated glyceride oil contains at least about 98% $C_{16}$-$C_{18}$ triglycerides, between about 8% and 30% by weight $C_{16}$ fat-forming acid content, has a Mettler Dropping Point of between 104° and 109° F., and has a Solids Fat Index (hereinafter SFI) profile of 62-68 at 50° F., 49-60 at 70° F., 42-56 at 80° F., 22-34 at 92° F., and 7-18 at 100° F. Also disclosed herein is an improvement in process for manufacturing an edible composition comprising a selectively hydrogenated glyceride oil and at least two lipoidal emulsifiers therefor. Such improvement comprises terminating said selective hydrogenation when the MDP of said glyceride oil is between about 104° and 109° F., and blending therewith at least two lipoidal emulsifiers. The lipoidal emulsifiers are selected from the group consisting of partial glycerides of higher fatty acids, polyoxyalkylene derivatives of partial glycerides of higher fatty acids, sorbitol and sorbitan esters of higher fatty acids, polyoxyalkylene derivatives of sorbitol and sorbitan esters of higher fatty acids, polyglycerol esters of higher fatty acids, and polyoxyalkylene derivatives of polyglycerol esters of higher fatty acids.

BRIEF DESCRIPTION OF THE DRAWINGS

FIGS. 1-5 will be described in detail in connection with Example 2 of this application.

DETAILED DESCRIPTION OF THE INVENTION

The novel composition disclosed herein comprises a selectively hydrogenated glyceride oil (or fat) and at least two lipoidal emulsifiers therefor.

Selective hydrogenation connotes hydrogenation of a glyceride oil or fat, normally with molecular hydrogen gas, to substantially eliminate all of the highly reactive polyethenoic unsaturation of the fat (the polyunsaturation typically being about 0 to 10% in the selectively hydrogenated product) and concomitantly providing a relatively high proportion of elaidinization in the remaining monounsaturated fatty acids (fat-forming acids) to give a "high trans" product (eg. 40-60% by weight trans fatty acid content). Thus, selective hydrogenation or elaidinization is used here in the broad sense to mean converting one or more olefinic double bonds of a fat-forming acid radical into a trans configuration (as distinguished from the cis configuration).

Conditions for conducting the selective hydrogenation typically include hydrogenation temperatures of about 100°-250° C., hydrogen pressures of between about 0 and 100 psig, and hydrogenation times of at least about two hours and more often 4-7 hours and longer. The catalytic selective hydrogenation preferably is conducted in the presence of a sulfided nickel catalyst normally having about 1-20% chemically bound sulfur by weight of the nickel and preferably about 5-12%. The proportion of sulfided nickel catalyst used generally will be between about 0.1 and about 3% by weight of the fat being subjected to the hydrogenation. Other catalysts useful for conducting a selective hydrogenation include previously used supported nickel that has been employed for the catalytic hydrogenation of fats, eg. about 2-4 times (such catalysts having been partially inactivated or somewhat poisoned because of such prior uses). The proportion of such used nickel catalyst typically will be from about 0.01 to about 0.2% by weight of the fat and preferably about 0.7%. Also, one may employ the dual catalyst scheme of John Hasman in his co-pending U.S. Pat. application Ser. No. 815,158, entitled "Trans-Acid Restricted Hard Butters", filed July 13, 1977. In this dual catalyst scheme, a copper chromite catalyst preferably promoted with barium oxide is used in a first-stage hydrogenation and conventional supported nickel catalyst is used in the second stage.

Fats or glyceride oils useful in the present invention are non-lauric or so-called "domestic" oils. The preferred fat for use in the present invention is an equal weight blend of soybean oil and cottonseed oil which blend is selectively hydrogenated, though each oil may be separately selectively hydrogenated and then blended. Other useful oils or fats include the oils safflower, palm, peanut, sunflower, low erucic rapeseed, corn, rice bran, sesame seed, citrus seed, the normally liquid fraction of lard or tallow, chicken fat, and especially mixtures of these oils.

In making the selectively hydrogenated fat, the conventional hydrogenation process is discontinued when the MDP of the fat is determined to be between about 104° and about 109° F. and preferably between about 105° and 108° F. The MDP of the selectively hydrogenated fat typically corresponds to an IV of between about 60 and 72, though the IV of the fat should not be relied upon as an indicia by which to terminate the selective hydrogenation or characterize the instant product. The selectively hydrogenated fat should contain at least about 98% $C_{16}$–$C_{18}$ fat-forming acid content, between about 8% and 30% $C_{16}$ fat-forming acid content, advantageously between about 10% and 25% $C_{16}$ fat-forming acid content, and preferably between about 15% and 20% $C_{16}$ (palmitic acid) fat-forming content, and have an SFI profile as follows (Solids Fat Index, or Solids Content Index, is a measure of dilatometry of a solid phase co-existing with a liquid phase of a fat at a given temperature, and it can be measured by the AOCS official method Cd-10-57):

| | SFI PROFILE | |
|---|---|---|
| Temp. (°F.) | Broadly | Preferably |
| 50 | 62–68 | 64–68 |
| 70 | 49–60 | 54–59 |
| 80 | 42–56 | 47–55 |
| 92 | 22–34 | 24–34 |
| 100 | 7–18 | 9–17 |
| MDP (°F.) | 104°–109° | 105°–108° |

The unique and surprising result discovered about the above-described selectively hydrogenated fat is that when blended with at least two lipoidal emulsifiers, such blend rated overall more organoleptically acceptable than its conventional counterpart having a lower MDP and excelled especially in meltability and lack of waxiness. The lack of waxiness characteristic of the instant composition is especially surprising for such a relatively hard or low IV product which contains at least about 7.5% stearic acid content ($C_{18:0}$ fatty acid content) and typically about 9–11% on up to 15% stearic acid content. For purposes of this application, a conventional counterpart with respect to the selectively hydrogenated fat (with or without lipoidal emulsifiers) is one which is selectively hydrogenated like the inventive fat under the same conditions but to a lower MDP, which typically corresponds to shorter total hydrogenation time.

About 1–5% by weight of the novel composition is a combination of at least two different lipoidal emulsifiers which is blended with the selectively hydrogenated fat to make a non-tempered, non-fractionated, non-lauric hard butter replacement. Desirably, conventional food grade emulsifiers are used and preferably equal proportions by weight of sorbitan monostearate and a polyoxyalkylene ether of sorbitan monostearate (polysorbate 60) comprise the lipoidal emulsifiers. (While "emulsifiers" is the term of the art used to refer to such compounds, it should be recognized that such compounds may be more accurately described as "crystal modifiers" as they modify the crystal morphology of the selectively hydrogenated fat). X-ray diffraction measurements of the novel composition disclosed herein indicated that all crystal phases were in the $\beta'$ form, though the particular crystal habit of the instant composition is not a limitation of the invention.

Conventionally such lipoidal emulsifiers have been used in edible fat compositions to improve one or more of the physical properties thereof, e.g. gloss, viscosity, temperability, and like physical properties. An important discovery in the present invention is that selected combinations of lipoidal emulsifiers unexpectedly improve the organoleptic properties of selectively hydrogenated fats and in particular such fats having an MDP of between about 104° and 109° F. are more organoleptically acceptable than counterpart fats having a lower MDP.

At least two lipoidal emulsifiers selected from the following group are blended with the selectively hydrogenated fat: partial glycerides of higher fatty acids, polyoxyalkylene derivatives of partial glycerides of higher fatty acids, sorbitol and sorbitan esters of higher fatty acids, polyoxyalkylene derivatives of sorbitol and sorbitan esters of higher fatty acids, polyglycerol esters of higher fatty acids, and polyoxyalkylene derivatives of polyglycerol esters of higher fatty acids. For present purposes isomers of sorbitol (e.g. mannitol, etc.) are included too. Higher fatty acids are $C_8$ and higher fat-forming acids (e.g. up to $C_{22}$–$C_{28}$) and typically are $C_{12}$–$C_{18}$ fat-forming acids. Specific lipoidal emulsifiers include, for example, sorbitan monostearate, sorbitan tristearate, various monoglycerides and diglycerides (optionally distilled), ethoxylated monoglycerides and diglycerides, ethoxylated sorbitan esters of higher fatty acids (e.g. polysorbate 60, 65, 80, etc.), higher fatty acids of polyglycerol (from about 3 to 10 glycerol units and preferably about 8) and their polyoxyalkylene derivatives, and the like.

Additionally, butterfat can be blended with the emulsified, selectively hydrogenated fat and even up to about 15% cocoa butter may be blended well therewith. Prime uses for the instant composition include as a biscuit or cracker coating, enrobings, especially when blended with cocoa powder and sweetener, and like uses.

The following Examples show how the present invention can be practiced but should not be construed as limiting. In this application, all percentages and parts are by weight and all degrees are degrees Fahrenheit, unless otherwise expressly indicated.

INTRODUCTION TO THE EXAMPLES

In the following Examples the following test procedures were used:

1. Viscosity

Viscosity is determined using a McMichael Viscometer (No. 26 wire) at 120° F. Viscosities of about 35°–70° M. are preferred for the coating.

2. Hardness

Eight grams of the coating are molded in a 148 mm long×50 mm wide 1 mm deep mold at 50° F. for 50 minutes, the bars demolded and held overnight at room temperature, and held in an incubator at 80° F. for 4 hours. Penetration measurements are made using an ASTM Universal Penetrometer attached to a cone (20° angle, 25 mm wide×67 mm long, 350 gms) which is applied to the sample for 10 seconds at which time the penetration in millimeters is recorded. Penetrations of about 3–4 mm. are preferred for the coating.

3. Set Time

A sample of the coating conditioned at 120° F. is placed in a container and a thermocouple inserted into the coating. The container is placed into a 50° F. water bath and the temperature of the coating recorded versus the time the sample is in the bath. After an initial drop in the temperature of the sample, the temperature will rise due to the latent heat of crystallization of the fat in the sample. The "set time" corresponds to the length of time after placement of the sample in the water bath at which the temperature is at a maximum due to the heat generated by the crystallization of the fat in the sample.

4. Gloss

Gloss is measured by a Gardner Gloss Meter (60° angle). On the scale of 0-100, higher readings are preferred for the coating.

5. Organoleptic Properties

Taste panels rated the coatings for several different properties and the results were translated to a numeral scale ranging from 1 to 9 with higher numbers corresponding to a better product.

6. Mettler Dropping Point

Apparatus necessary for performing the Mettler Dropping Point determination includes the Mettler Instrument Corporation electronic control FP5 modified to heat at a slower rate and Mettler furnace FP53 with accessories, and Wiley Melting Point plates. Accessories are at least one sample cup, which fits into a cartridge, which assembly in turn fits into a sleeve. The sample cups have a bottom opening of 2.8 mm diam. They also fit into the holes of the Wiley plate.

One melts the fat sample and fills the cup dropwise with the sample after the cup has been precooled and still remains in the Wiley plate holes, said plate being in a tray of dry ice (solid carbon dioxide). It is not necessary to level off the top of the cup. The sample then is chilled for at least ten minutes.

A starting temperature 5° C. below the expected melting point is set on the furnace control, along with a programmed heating rate of 1° C. per minute. When furnace temperature agrees with the indicator on the control unit, the chilled dropping point cup is removed from the dry ice tray by using the upper portion of the cartridge and assembled with such cartridge, then the drop-collecting sleeve is attached. This assembly is inserted vertically into the furnace and rotated until the cartridge locks in position. At this stage the cup is equilibrated with the lowest temperature of the furnace by waiting two minutes, then the automatic heating rate is activated. The Dropping Point will be recorded by the apparatus, usually in °C. The Dropping Point very closely approximates the Wiley Melting Point, and it is more reproducible; it eliminates an operator's subjectivity which is inherent in measurement of Wiley Melting Point.

EXAMPLE 1

This is a comparative example wherein no emulsifiers were added to the selectively hydrogenated fat which was to be evaluated for its physical and organoleptic properties.

Equal weight blends of soybean oil and cottonseed oil were selectively hydrogenated under the following hydrogenation conditions:

*Catalyst: 0.1% Nickel Catalyst (nickel metal),
Pressure: 40 psig. $H_2$,
Temperature: 200° C.

*PRICAT 9908 nickel catalyst supplied by Unichemica International, Hamburg, Federal Republic of Germany, active nickel on a Kieselguhr support (22% nickel by weight of catalyst) protected in a hardened vegetable oil and believed to be a sulfided nickel catalyst containing about 1.23% chemically bound sulfur by weight of the nickel content of the catalyst.

The hydrogenated oils were bleached with Filtrol 105 bleaching clay and deodorized with about 0.02% citric acid. The physical-chemical properties of the resulting oils appear in Table 1 below:

TABLE 1

| PROPERTY | SAMPLE 1 | SAMPLE 2 | SAMPLE 3 |
|---|---|---|---|
| SFI Profile | | | |
| 50° F. | 59.3 | 64.4 | 65.5 |
| 70° F. | 47.6 | 54.7 | 57.5 |
| 80° F. | 40.4 | 49.0 | 53.0 |
| 92° F. | 18.1 | 27.6 | 32.9 |
| 100° F. | 3.9 | 12.0 | 16.7 |
| Wiley Melting Point (WMP, °F.) | 102.8 | 106.6 | 109.9 |
| MDP (°F.) | 103.1 | 105.8 | 107.4 |
| Fatty Acid Analysis (wt-%) | | | |
| C16:0 | 16.7 | 16.4 | 16.6 |
| C18:0 | 7.8 | 10.8 | 10.7 |
| C18:1 | 65.5 | 64.5 | 63.3 |
| C18:2 | 8.5 | 7.8 | 7.8 |
| Calculated IV | 71.3 | 69.2 | 68.2 |
| Chemical IV (Wijs Method) | 72.1 | 69.5 | 68.3 |
| % Trans-Oleic Acid | 56.1 | 54.8 | 52.2 |
| % Free Fatty Acid | 0.01 | 0.04 | 0.01 |

Each sample was formulated into a confectionary coating for organoleptic evaluation and functional property evaluation. The confectionary coating formulation used is given below:

| | |
|---|---|
| 65.9% | Cocoa Dry Mix |
| 33.6% | Selectively Hydrogenated Oil |
| 0.4% | Lecithin |
| 0.05% | Methyl Vanillin |

The results of the evaluations are displayed in Table 2:

TABLE 2

| | SAMPLE 1 | SAMPLE 2 | SAMPLE 3 |
|---|---|---|---|
| Functional Properties | | | |
| Viscosity (°M) | 55 | 56 | 62 |
| Hardness (mm. penetration at 80° F.) | 5.18 | 2.98 | 2.60 |
| Set Time (Min) | 10.59 | 10.04 | 7.57 |
| Initial Gloss | 63.4 | 60.0 | 70.1 |
| Avg. Gloss (10-day cycling storage) | 29.2 | 46.13 | 59.3 |

TABLE 2-continued

|  | SAMPLE 1 | SAMPLE 2 | SAMPLE 3 |
| --- | --- | --- | --- |
| Organoleptic Properties |  |  |  |
| Meltability | 4.54 | 3.32 | 3.93 |
| Lack of Waxiness | 4.57 | 3.46 | 4.32 |
| Hardness | 4.07 | 5.25 | 5.50 |
| Flavor Release | 4.89 | 3.82 | 4.54 |
| Overall Acceptance | 4.46 | 3.61 | 4.25 |

The above-tabulated results show the three samples to possess acceptable functional properties for present commercial hard butters, but marginal organoleptic properties. Certainly, there is little, if any, discernible difference in organoleptic properties of the three samples.

EXAMPLE 2

This is an example wherein emulsifiers were added to the selectively hydrogenated fat to make the novel composition of the present invention.

Two batches of selectively hydrogenated fat were compounded into an edible confectionary coating for organoleptic evaluation. Each batch (6000 grams each) was the composite of six individual selective hydrogenation runs wherein a blend of soybean oil and cottonseed oil (50% by weight of each oil) was selectively hydrogenated in the presence of the Pricat 9908 nickel catalyst. The individual runs each produced a product having the same MDP (± about 0.5° F.), one set of 6 runs producing a product having an MDP within the scope of the present invention and the other 6 runs producing having an MDP less than and outside of the scope of the present invention (a conventional counterpart). Typical hydrogenation conditions prevailing for the runs were about the same as the conditions reported in Example 1. The physical-chemical properties of each batch were as follows:

| PROPERTIES OF SELECTIVELY HYDROGENATED FAT | | |
| --- | --- | --- |
| PROPERTY | BATCH 1 | BATCH 2 |
| SFI Profile |  |  |
| 50° F. | 64.8 | 58.2 |
| 70° F. | 56.2 | 46.2 |
| 80° F. | 51.3 | 38.2 |
| 92° F. | 31.4 | 16.1 |
| 100° F. | 13.6 | 3.2 |
| Wiley Melting Point (°F.) | 107.8° | 103.4° |
| Mettler Dropping Point (°F.) | 106.9° | 101.4° |
| Fatty Acid Content (wt-%) |  |  |
| C16:0 | 16.7 | 16.3 |
| C18:0 | 10.3 | 7.4 |
| C18:1 | 65.0 | 65.7 |
| C18:2 | 7.1 | 8.7 |
| Free Fatty Acid (%) | 0.07 | 0.04 |
| Calculated Iodine Value | 68.3 | 71.6 |
| Chemical Iodine Value (Wijs Method) | 66.7 | 73.1 |
| Trans Acid Content (%) | 52.8 | 55.9 |

Each batch of fat then was filtered for removal of catalyst, bleached with bleaching clay (FILTROL 105 clay), and deodorized with 0.02% by weight citric acid.

The batches then were divided into five separate samples as follows:

|  | BATCH 1 (wt-%) | BATCH 2 (wt-%) | MDP (°F.) |
| --- | --- | --- | --- |
| SAMPLE 1 | 100 | 0 | 106.9 |
| SAMPLE 2 | 75 | 25 | 105.5 |
| SAMPLE 3 | 50 | 50 | 104.1 |
| SAMPLE 4 | 25 | 75 | 102.8 |
| SAMPLE 5 | 0 | 100 | 101.4 |

Each sample then was blended with varying proportions of two lipoidal emulsifiers, DURTAN 60 (sorbitan monostearate) and DURFAX 60 (polysorbate 60), at a total of 3% by weight of the resulting blend (DURFAX is a trademark and DURTAN is a registered trademark of SCM Corporation, Cleveland, Ohio).

All resulting samples (selectively hydrogenated fat plus emulsifiers) then were compounded into a confectionary coating for organoleptic evaluation. The confectionary coating formulation used is the same as that of Example 1. A taste panel rated all the coatings for overall acceptance on a scale of 1 to 9 with higher numbers corresponding to a more overall acceptable product.

Figure 1:
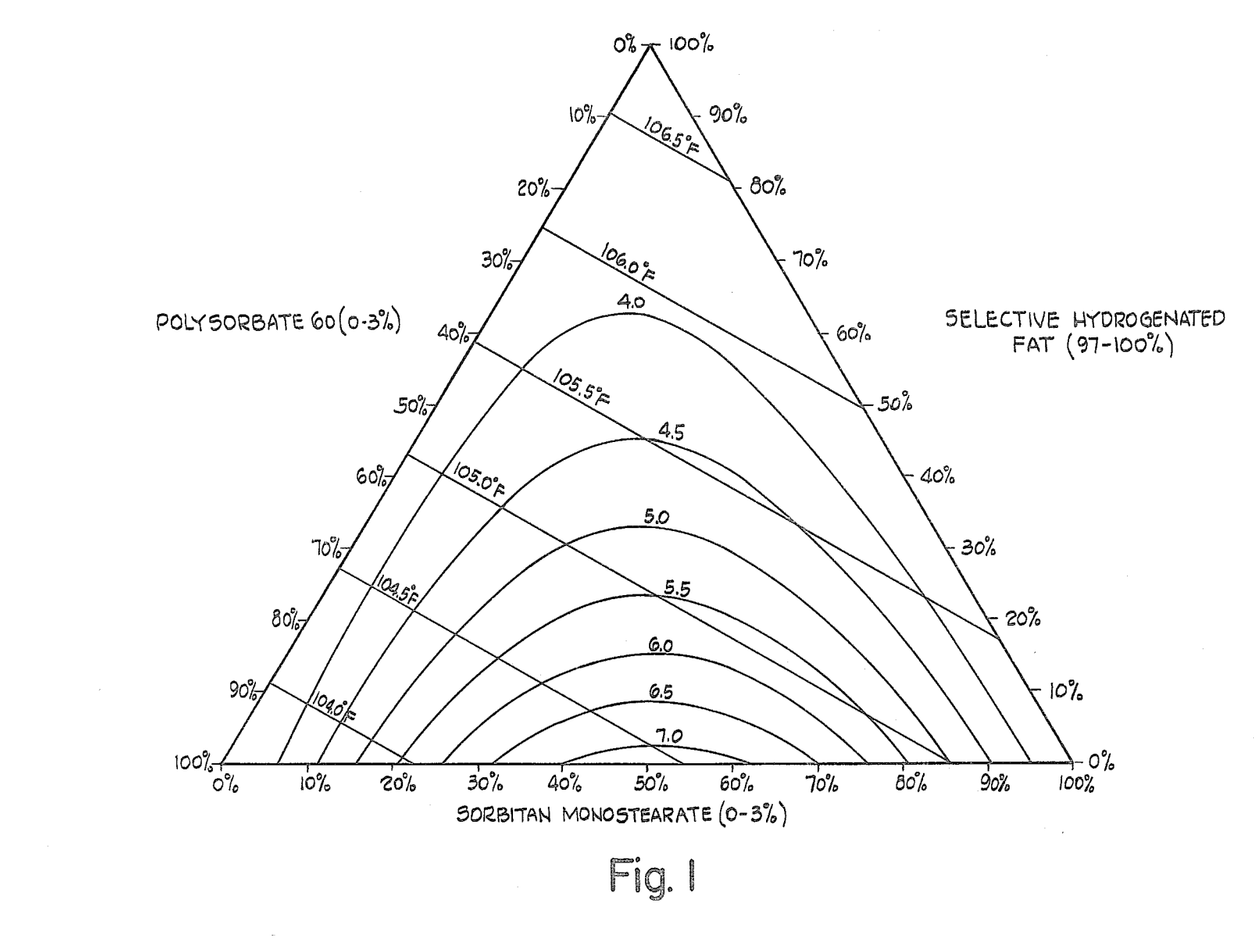
FIGS. 1-5 display graphically the results of organoleptic evaluation testings of several coatings formulated from selectively hydrogenated fats plus two lipoidal emulsifiers. The Mettler Dropping Points (MDP) of the various fat plus emulsifier samples also are displayed in the Figures.
Figure 2:
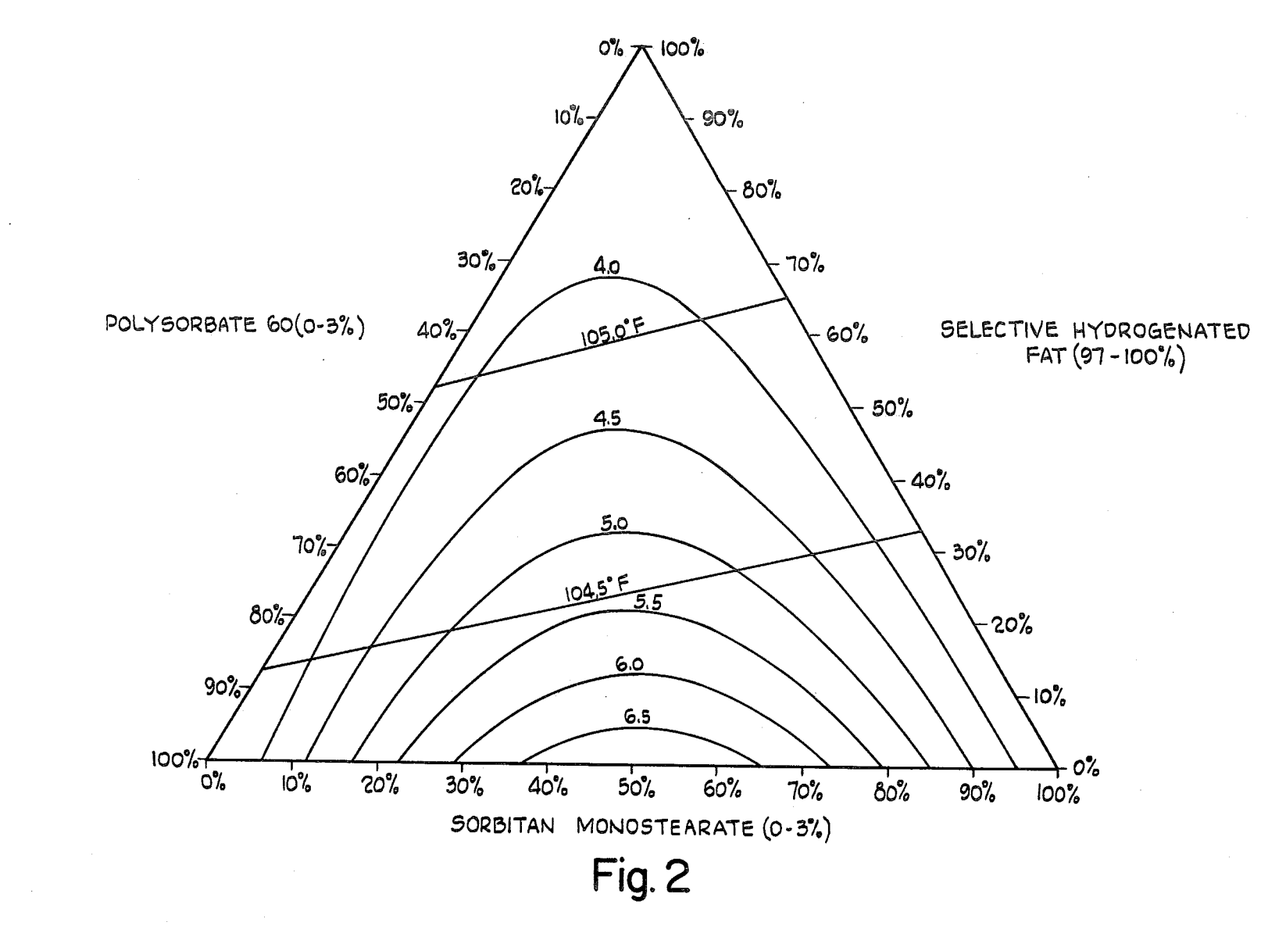
Figure 3:
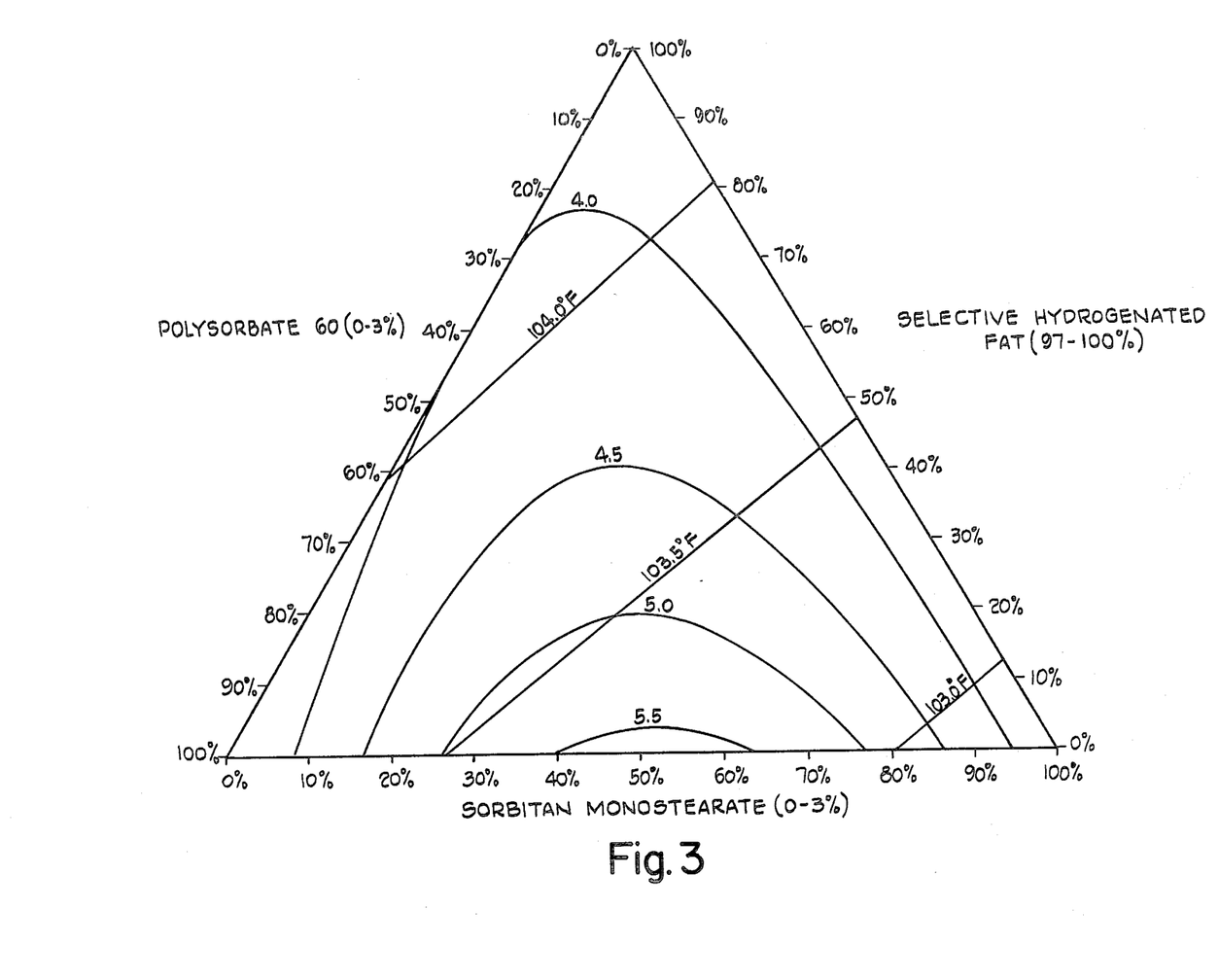
Figure 4:
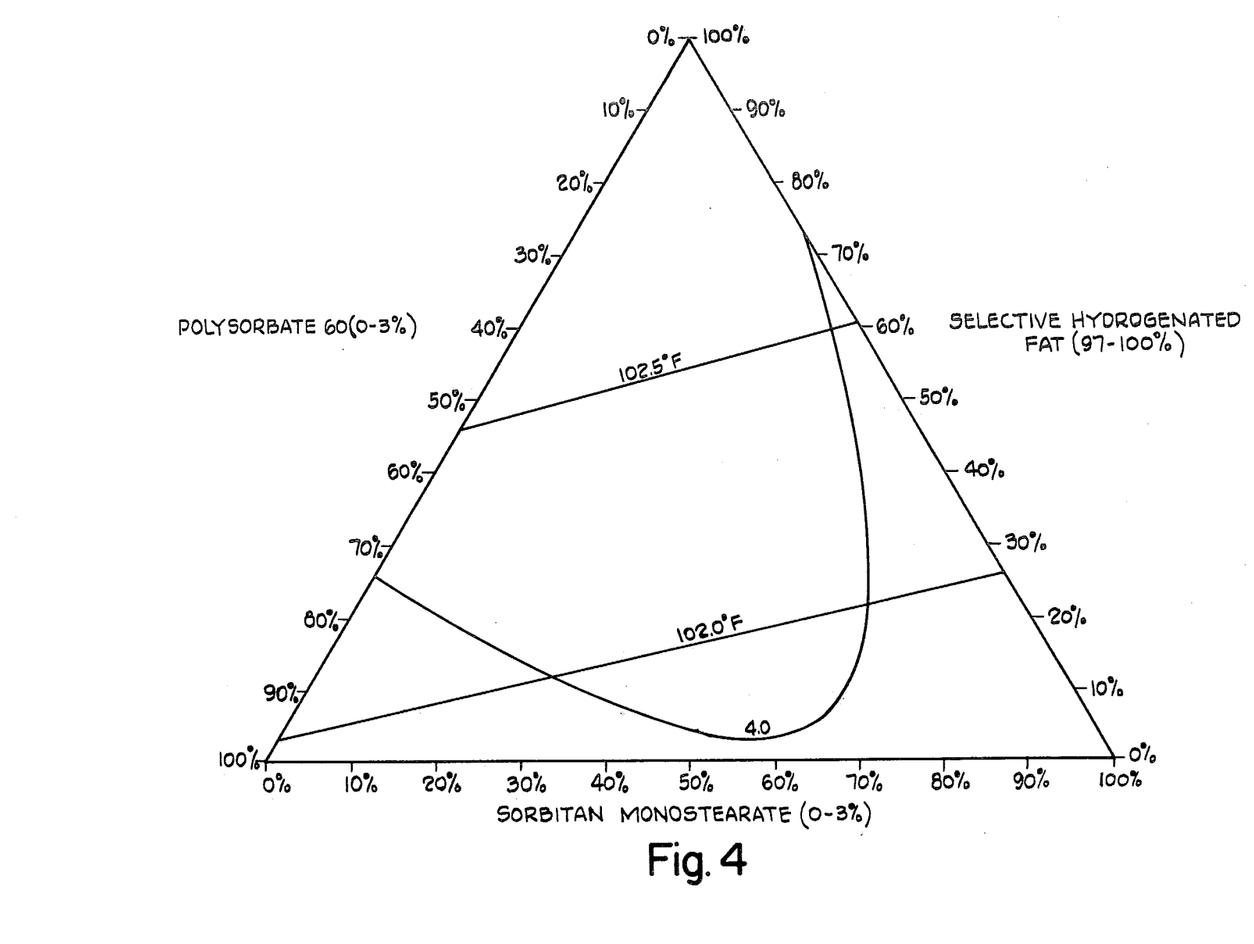
Figure 5:
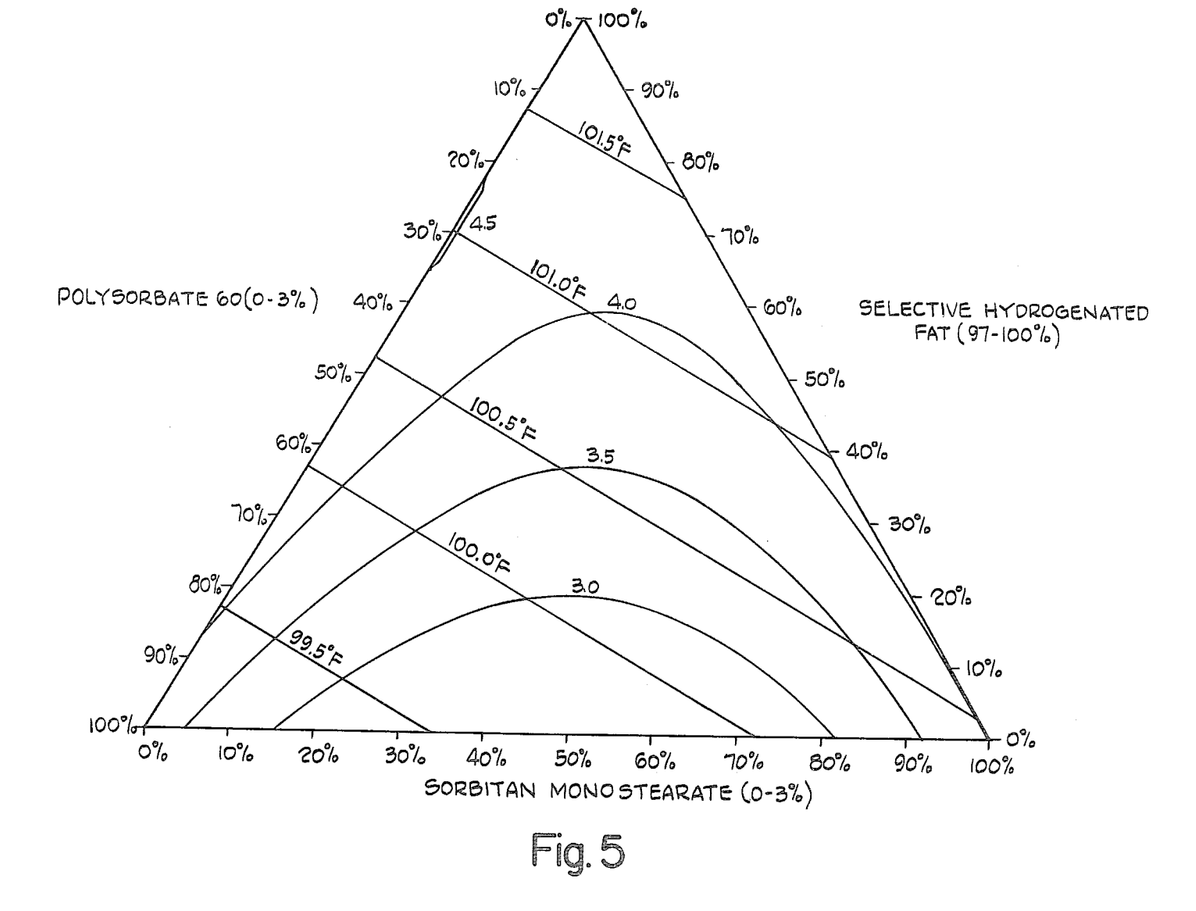

The results of the organoleptic evaluation testing and the MDPs of the various emulsified fat samples are displayed graphically in FIGS. 1-5 for Samples 1-5, respectively. Initially, it should be noted that Sample 1 produced from the selectively hydrogenated fat having the highest MDP rated as the most organoleptically acceptable product. Overall, the samples ranked from the most organoleptically acceptable to the least acceptable corresponding to the selectively hydrogenated fat with the highest MDP to the lowest MDP, respectively. Further, Sample 3 formulated from the hydrogenated fat having a MDP of 104.10 appears to be the lowest ranking organoleptically acceptable product with Samples 1 and 2 produced from hydrogenated fat having MDPs less than 104° F., being relatively unacceptable compared to Samples 1-3.

Of significance when comparing the organoleptic evaluation results of Examples 1 and 2, the following should be noted.

1. The addition of the two lipoidal emulsifiers to the hydrogenated fat significantly improved the organoleptic acceptance of those samples having a MDP within the range of the present invention—Samples 1 and 2 of Example 1 and Samples 1-3 of Example 2.

2. The samples formulated from the selectively hydrogenated fats having a MDP within the range of the present invention were more organoleptically acceptable than the samples having lower MDPs.

3. The good organoleptic rating of Samples 1-3 of Example 2 were achieved only with a combination of lipoidal emulsifiers.

4. Coatings formulated from the low MDP selectively hydrogenated fats and which had the same MDP as coatings formulated from high MDP selectively hydrogenated fats did not rate as organoleptically acceptable as the coatings formulated from the high MDP selectively hydrogenated fats.

All coatings also were evaluated for their functional properties. Most all coatings rated within acceptable standards for hard butter coatings with viscosities ranging from 35°–70° M., gloss readings of 2.00–3.25, penetrations of less than 2.4–5.6 mm, and cycling storage average gloss readings of 40–70. Thus, the novel composition of the present invention (selectively hydrogenated fat plus emulsifiers) maintains acceptable functional properties while being an organoleptically more acceptable product.

EXAMPLE 3

Further characterization of the novel composition of this invention was conducted on samples of soybean oil/cottonseed oil equal weight blends which had been hydrogenated with the PRICAT 9908 catalyst (0.55 wt-%) at a hydrogen pressure of 48–77 psig and temperature of 192°–217° C. All samples were filtered, bleached, and deodorized in a manner similar to the procedures of Examples 1 and 2.

Three batches of selectively hydrogenated fat were each divided into 2 lots, each lot being blended with 1.17% each of DURTAN 60 and DURFAX 60 emulsifiers. Physical-chemical analysis of the resulting 6 samples yielded the following results displayed in Table 3. Sample, 1, 2 and 3 are the selectively hydrogenated fats and Samples 1E, 2E, and 3E are Samples 1, 2, and 3 blended with two emulsifiers, respectively.

TABLE 3

| | Sample 1 | Sample 1E | Sample 2 | Sample 2E | Sample 3 | Sample 3E |
|---|---|---|---|---|---|---|
| SFI Profile | | | | | | |
| 50° F. | 56.9 | 56.7 | 66.2 | 65.8 | 67.3 | 67.9 |
| 70° F. | 42.1 | 41.8 | 55.6 | 54.7 | 59.0 | 58.2 |
| 80° F. | 32.2 | 30.9 | 49.7 | 48.3 | 54.7 | 53.3 |
| 92° F. | 11.7 | 11.2 | 26.3 | 25.5 | 33.3 | 32.3 |
| 100° F. | 2.3 | 1.9 | 9.0 | 8.6 | 15.0 | 14.4 |
| MDP (°F.) | 98.4 | 97.0 | 105.3 | 102.9 | 108.0 | 105.6 |

The addition of the emulsifiers results in a slight lowering of the solids content of each sample as the above tabulated results show. The MDP of each sample is lowered too, with Samples 2 and 3 of this invention having their MDP depressed greater than Sample 1.

I claim:

1. An edible hard butter composition suitable as a cocoa butter replacement, having improved meltability, lack of waxiness, and overall organoleptic acceptability, blended using a higher melting point fat, as compared to a conventional cocoa butter replacement hard butter, comprising about 95–99% of selectively hydrogenated glyceride oil containing at least about 98% $C_{16}$–$C_{18}$ triglycerides of which between about 8 and 30% is of a $C_{16}$ fat-forming acid content, having a Solids Fat Index profile of about
   62–68 at 50° F.
   49–60 at 70° F.
   42–56 at 80° F.
   22–34 at 92° F.
   7–18 at 100° F., and a Mettler Dropping Point of between about 104° and 109° F.; and about 1–5% of at least two lipoidal emulsifiers selected from the group consisting of partial glycerides of higher fatty acids, polyoxyalkylene derivatives of partial glycerides of higher fatty acids, sorbitol and sorbitan esters of higher fatty acids, polyoxyalkylene derivatives of sorbitol and sorbitan esters of higher fatty acids, polyglycerol esters of higher fatty acids, and polyoxyalkylene derivatives of polyglycerol esters of higher fatty acids wherein said higher fatty acids are $C_8$–$C_{28}$ fatty acids.

2. The composition of claim 1 wherein said selectively hydrogenated glyceride oil has a Solids Fat Index profile of about
   64–68 at 50° F.
   54–59 at 70° F.
   47–55 at 80° F.
   24–34 at 92° F.
   9–17 at 100° F.

3. The composition of claim 2 wherein said selectively hydrogenated glyceride oil contains between about 40% and 60% of its fat-forming acids in the trans configuration.

4. The composition of claim 3 wherein said Mettler Dropping Point of a said selectively hydrogenated oil is between about 105° and 108° F.

5. The composition of claim 1 wherein said emulsifiers are sorbitan monostearate and polysorbate 60.

6. The composition of claim 1 wherein said selectively hydrogenated glyceride oil is a mixture of soybean oil and cottonseed oil.

7. The composition of claim 6 containing about equal proportions by weight of said soybean oil and said cottonseed oil, and between about 1.0 to 2.0% each of sorbitan monostearate and polysorbate 60 as said lipoidal emulsifiers.

8. The composition of claim 1 wherein said $C_{16}$ fat-forming acid content of said selectively hydrogenated glyceride oil is between about 15% and 20%.

9. A process for manufacturing an edible hard butter composition suitable as a cocoa butter replacement, having improved meltability, lack of waxiness, and overall organoleptic acceptability, blended using a higher melting point fat, as compared to a conventional cocoa butter replacement hard butter, comprising a selectively hydrogenated glyceride oil and at least two lipoidal emulsifiers therefor, which comprises terminating a selective hydrogenation of a glyceride oil when the Mettler Dropping Point of said glyceride oil is between about 104° and 109° F. to obtain said selectively hydrogenated glyceride oil, said selectively hydrogenated oil containing at least about 98% $C_{16}$–$C_{18}$ triglycerides of which between about 8% and 30% is of a $C_{16}$ fat-forming acid content, having a Solids Fat Index profile of about
   62–68 at 50° F.
   49–60 at 70° F.
   42–56 at 80° F.
   22–34 at 92° F.
   7–18 at 100° F.; and blending with said selectively hydrogenated oil between about 1% and 5% of at least two lipoidal emulsifiers selected from the group consisting of partial glycerides of higher fatty acids, polyoxyalkylene derivatives of partial glycerides of higher fatty acids, sorbitol and sorbitan esters of higher fatty acids, polyoxyalkylene derivatives of sorbitol and sorbitan esters of higher fatty acids, polyglycerol esters of higher fatty acids, and polyoxyalkylene derivatives of polyglycerol esters of higher fatty acids wherein said higher fatty acids are $C_8$–$C_{28}$ fatty acids.

10. The process of claim 9 wherein said glyceride oil is a blend of soybean oil and cottonseed oil.

11. The process of claim 9 wherein said glyceride oil is selectively hydrogenated with a sulfided nickel catalyst.

12. The process of claim 9 wherein said lipoidal emulsifiers comprise sorbitan monostearate and polysorbate 60.

13. The process of claim 9 wherein said selectively hydrogenated oil has a Solids Fat Index profile of about 64–68 at 50° F.
54–59 at 70° F.
47–55 at 80° F.
24–34 at 92° F.
9–17 at 100° F.

* * * * *